United States Patent [19]

Baker et al.

[11] Patent Number: 5,132,050

[45] Date of Patent: Jul. 21, 1992

[54] DEVELOPER ROLLER WITH SEMICONDUCTIVE ADDITIVE COMPRISING A RUBBER BODY CONTAINING SOYADIMETHYLETHYL-AMMONIUM ETHOSULFATE OR (3-LAURAMIDOPROPYL)TRIMETHYLAMMONIUM-METHYLSULFATE

[75] Inventors: Ronald W. Baker, Versailles; John A. Thompson, Lexington, both of Ky.

[73] Assignee: Lexmark International, Inc., Greenwich, Conn.

[21] Appl. No.: 528,517

[22] Filed: May 25, 1990

[51] Int. Cl.$^5$ ............................................... H01B 1/20
[52] U.S. Cl. .................................. 252/500; 29/132; 428/375; 428/379; 428/390; 252/50; 524/236
[58] Field of Search .................. 252/500, 50; 524/236; 428/375, 379, 390; 29/132

[56] References Cited

U.S. PATENT DOCUMENTS

| | | | |
|---|---|---|---|
| 3,959,574 | 5/1976 | Seanor et al. | 29/132 |
| 4,058,879 | 11/1977 | Lentz et al. | 29/132 |
| 4,100,884 | 7/1978 | Mochizuki et al. | 118/653 |
| 4,317,265 | 3/1982 | Chase et al. | 252/500 |
| 4,323,634 | 4/1982 | Jadwin | 430/110 |
| 4,710,015 | 12/1987 | Takeda et al. | 355/3 DD |
| 5,091,452 | 2/1992 | Ko et al. | 524/155 |

*Primary Examiner*—Paul Lieberman
*Assistant Examiner*—Bradley A. Swope
*Attorney, Agent, or Firm*—John A. Brady

[57] ABSTRACT

A rubber developer roller having a quaternary ammonium material as an antistatic agent to achieve an approximately one order of magnitude increase in the level of conductivity. This provides consistent printing over a range of temperatures of operation, particularly at start-up when the printer has not reached its designed operating temperature, and over a range of environmental conditions. This roller also permits the increase of print speed.

4 Claims, No Drawings

DEVELOPER ROLLER WITH SEMICONDUCTIVE ADDITIVE COMPRISING A RUBBER BODY CONTAINING SOYADIMETHYLETHYL-AMMONIUM ETHOSULFATE OR (3-LAURAMIDOPROPYL)TRIMETHYLAMMONIUM-METHYLSULFATE

TECHNICAL FIELD

This invention relates to developer rollers used in electrophotography, and more specifically, to the formulation of such rollers as it affects their conductivity. Such rollers typically must be semiconductive, and the degree of that conductivity affects printing and the consistency of printing.

BACKGROUND OF THE INVENTION

Existing developer rollers which this invention improves upon are typically semiconductive rubber with a thin outer, insulation layer of polyurethane. Such developer rollers have a conductive center shaft to which an electrical potential is applied which is approximately one half of the potential to which non-imaged areas of a photoconductive surface are charged, with the imaged areas being substantially at zero volts. Toner powder is separately charged, applied to the developer roller, and regulated in thickness and charge by a electrically charged doctor blade as the developer roller is turned. The developer roller then makes nip contact with the photoconductive surface, which typically is a roller or belt moving with the developer roller.

The parameters of the foregoing system can be selected to develop an optimum image on the photoconductor at given ambient characteristics. However, at start-up and at extreme environments, such parameters are ineffective since the machine is operating out of the range assumed in their selection. Specifically, when the system is relatively cool, a rubber roller will be significantly less conductive and the reduced conductivity will result in lines in the printing being narrower. Increasing the potential to the developer roller would correct the start-up images but cause later images to be wide and dark. This invention adjusts the conductivity of the rubber of the developer roller to overcome this problem.

U.S. Pat. No. 4,710,015 to Takeda et al teaches such a developer roller and system, but the additives to its developer roller rubber; copper, nickel, and carbon black; are not disclosed as being for the purpose of curing start-up and similar problems, and such additives are believed to undesirably change the mechanics of the roller and to make the roller more conductive than is desirable to cure such start-up problems. U.S. Pat. No,. 4,100,884 to Mochizuki et al, particularly the FIG. 3 embodiment, is of interest for its showing of a rubber roller.

The preferred embodiment of this invention is a change in the developer roller formulation to add a quaternary ammonium material and is otherwise identical with the prior printer sold by the assignee of the invention with the name Laser Printer and the number designation 4019.

DISCLOSURE OF THE INVENTION

In accordance with the invention a quaternary ammonium material antistatic agent is added to the rubber formulation of such a developer roller. An approximately one order of magnitude increase in the level of semiconductivity is achieved, and consistent printing is realized over a range of temperatures and humidities of operation, particularly at start-up when the printer has not reached the operating temperature for which it is designed. Additionally, the reduced resistivity permits higher printing speeds.

BEST MODE FOR CARRYING OUT THE INVENTION

The rubber formulation for the developer roller of this invention is described immediately below in the table. This formulation differs from the previous formulation in that the Larostat 519, a trademark product of Mazer Chemicals, is added.

RUBBER FORMULATION

| COMPONENT | TRADE NAME | MANUFACTURER | PARTS BY WT. |
|---|---|---|---|
| NITRILE RUBBER | HYCAR VT355 ELASTOMER | TRADEMARK OF B. F. GOODRICH | 100.0 |
| LIQUID NITRILE PLASTICIZER | HYCAR 1312LV ELASTOMER | TRADEMARK OF B. F. GOODRICH | 30.0 |
| FACTICES (PROCESSING AID; VULCANIZED VEGETABLE OIL) | CARTER BELL BROWN VV0-GRADE 2L | HARWICK CHEMICAL CORP. | 30.0 10.0 |
| ZINC OXIDE (ACTIVATOR) | PERSPERSION PAB-866 | TRADEMARK OF SYNTHETIC PRODUCTS CO. | 5.0 |
| ANTIOXIDANT (SOLID) | OCTAMINE | TRADEMARK OF UNIROYAL CHEMICAL CO. INC. | 2.0 |
| STEARIC ACID (POWDER; ACTIVATOR) | RUBBER GRADE STEARIC ACID, USP | THE C. P. HALL CO. | 1.0 |
| MBTS (TETRAMETHYLTHIURAM; DISULFIDE CURATIVE AGENT) | POLY-DESPERSION AAD-75 | TRADEMARK OF RHEIN CHEMI COPR. | 3.33 |
| TMTD (2-MERCAPTOBENZOTHIAZYL DISULFIDE; CURATIVE AGENT) | POLY-DESPERSION V(MT)D-75P | TRADEMARK OF RHEIN CHEMI COPR. | 1.67 |
| SULFUR DONER (CURATIVE AGENT) | POLY-DESPERSION E(SR)D-75 | TRADEMARK OF RHEIN CHEMI COPR. | 3.33 |
| ANTISTATIC | LAROSTAT 519 | TRADEMARK OF | 2.5 |

| COMPONENT | TRADE NAME | MANUFACTURER | PARTS BY WT. |
|---|---|---|---|
| -continued RUBBER FORMULATION | | | |
| AGENT | | MAZER CHEMICALS | |
| | | TOTALS: | 158.83 |

The rubber is first milled until softened. Then all ingredients but the plasticizer are added and the mixture milled until thoroughly dispersed. Then the plasticizer is added, and the mixture milled until thoroughly dispersed. This mixture is forced into a mold with pressure to form the developer rollers. The rollers are cured in the mold at 154° C. (310° F.) for 25 minutes. The rollers are then baked after molding and before grinding at 149°±5° C. (300°±9° F.) for 2°±0.25 hours.

Bulk resistivity is reduced from approximately 5000 megohm-cm to approximately 500 megohm-cm at room conditions. Further amounts of the ammonium material reduce resistivity, but to a much less degree. This change in conductivity by a factor of 10 not only virtually eliminates environmental sensitivity in the foregoing 4019 printer, but makes possible increased printing speed up to two times.

Larostat 519 is soyadimethylethyl-ammonium ethosulfate mixed with amorphous silica. The ammonium compound is the only electrically active ingredient as the silica keeps the mixture flowable while being chemically inactive and electrically insulative in the formulation. Sixty percent by weight of the Larostat 519 is the ammonium compound, the active ingredient.

The range of effectiveness of the Larostat 519 in the foregoing 4019 printer has been found to be between 0.5 parts per hundred (phr) by weight to 4.0 phr by weight of the rubber ingredient, which equates to the active ingredient being between 0.3 phr by weight and 2.4 phr by weight of the rubber ingredient. At lower levels functional improvement is not realized. At higher loading fine-line print resolution is degraded. At higher print speeds the higher amount can be increased roughly linearly; for example, 8.0 phr Larostat 519 at twice the print speed. The foregoing formula with 1 phr Larostat 519 may be suitable while conserving toner because of the amount of toner transferred from the roller to the photoconductor varies with the resistivity of the roller.

Larostat 519 is sold commercially as an antistatic agent.

Another commercial antistatic agent which appears effective in a formulation such as the foregoing to alter the resistivity in accordance with this invention is Cyastat LS, a trademark product of American Cyanamid Company. Chemically, Cyastats LS antistatic agent is (3-lauramidopropyl)trimethylammonium methylsulfate. Cyastat LS antistatic agent achieves the same reduction in resistivity as achieved for 0.5 phr to 4.0 Larostat 519 with loading in the range of 3 phr to 5 phr of the rubber ingredient. Since the Larostat 519 material alters the resistivity with lower loading, that was pursued since the lower loading limits mechanical-property changes in the roller.

A broadly similar quarternary ammonium product, however, appears ineffective. That material is CETATS, a product sold as a surface active agent by Hexcel Chemical Products. Chemically CETATS is N-hexadecyl-N,N,N-trimethyl ammonium-p-toluene sulfonate. It can be speculated that both the hexadecyl group and the phenyl group create steric problems influencing conductivity.

It will be readily apparent that antistatic agents are broadly functional with organic materials and that the material of the rubber formula can differ greatly within the spirit and scope of this invention.

What is claimed is:

1. A developer roller which is semiconductive comprising a rubber body containing soyadimethylethyl-ammonium ethosulfate in an amount of between 0.5 phr to 4.0 phr by weight of said rubber, blended therein to increase conductivity of said body.

2. The developer roller as in claim 1 in which the rubber of said body is nitrile rubber.

3. A developer roller which is semiconductive comprising a rubber body containing (3-lauramidopropyl) trimethylammonium-methylsulfate in an amount of between 3 phr to 5 phr by weight of said rubber, blended therein to increase conductivity of said body.

4. The developer roller as in claim 3 in which the rubber of said body is nitrile rubber.

* * * * *

UNITED STATES PATENT AND TRADEMARK OFFICE
CERTIFICATE OF CORRECTION

PATENT NO. : 5,132,050
DATED : July 21, 1992
INVENTOR(S) : Ronald W. Baker et al It is certified that error appears in the above—identified patent and that said Letters Patent is hereby corrected as shown below:

Col. 2, Table at bottom, Right Column     Delete "30.0" second occurrence.

Col. 3, line 17,     Change "2°" to read -- 2 --.

Signed and Sealed this

Twenty-sixth Day of October, 1993

Attest:

BRUCE LEHMAN

Attesting Officer     Commissioner of Patents and Trademarks